United States Patent [19]

Schwanz et al.

[11] 4,098,525
[45] Jul. 4, 1978

[54] VEHICLE STEERING WHEEL SAFETY DEVICE

[75] Inventors: Wilfried Schwanz, Ahnsen; Ulrich Seiffert, Braunschweig; Peter Beher, Wolfsburg, all of Fed. Rep. of Germany; Hannu Paitula, Sodertalje, Sweden

[73] Assignee: Volkswagenwerk Aktiengesellschaft, Fed. Rep. of Germany

[21] Appl. No.: 697,690

[22] Filed: Jun. 18, 1976

[30] Foreign Application Priority Data

Jul. 4, 1975 [DE] Fed. Rep. of Germany ....... 2529920

[51] Int. Cl.² ............................................. B60R 21/02
[52] U.S. Cl. ..................................... 280/750; 74/552; 188/1 C; 280/751
[58] Field of Search ....................... 280/751, 752, 750; 74/552, 492; 188/1 C

[56] References Cited

U.S. PATENT DOCUMENTS

| | | | |
|---|---|---|---|
| 1,647,903 | 11/1927 | Cook | 74/552 X |
| 2,784,006 | 3/1957 | Dye et al. | 280/750 |
| 3,087,352 | 4/1963 | Daniel | 74/552 |
| 3,189,367 | 6/1965 | Glass | 280/750 |
| 3,546,964 | 12/1970 | Barenyi et al. | 74/552 |
| 4,032,175 | 6/1977 | Aibe | 188/1 C |

*Primary Examiner*—Bruce H. Stoner, Jr.
*Assistant Examiner*—Michael J. Forman
*Attorney, Agent, or Firm*—Brumbaugh, Graves, Donohue & Raymond

[57] ABSTRACT

A safety device for a vehicle steering wheel is designed to provide increased protection against injury in the event the driver's head strikes the steering wheel on the occurrence of a collision. Increased protection against a head injury is provided by an impact energy dissipating member which provides increased energy dissipation upon impact by a relatively small object, such as the driver's head, as compared to prior devices which protected merely against impact by the entire body. The dissipating member includes first and second hollow bodies arranged one within the other.

8 Claims, 4 Drawing Figures

VEHICLE STEERING WHEEL SAFETY DEVICE

BACKGROUND OF THE INVENTION

The present invention relates to safety devices for vehicle steering wheels, and in particular to such safety devices which provide an impact absorbing member disposed above the hub and spokes of the steering wheel to dissipate energy upon impact by a vehicle operator on the occurrence of a collision.

Prior art safety devices, designed to provide impact energy absorbing protection when a vehicle operator is thrown forward onto the steering wheel upon the occurrence of a collision, have been designed for impacts by the entire upper body of the operator. Such prior art safety devices have therefore been designed for impacts in which the impact area is considerably large, corresponding to the entire upper body. Such impacts occur when the upper body is not restrained.

With the increased use of vehicle safety belts, particularly those which include a belt across the upper body of the vehicle occupants, such as a shoulder belt, the frequency of driver impact on the steering wheel with the chest has been considerably decreased. In a severe collision, however, even when an operator is using a seat and shoulder belt, it is possible for his head to be thrown forward in a nodding motion and impact upon the steering wheel. Motion of the vehicle steering wheel upwards and toward the back of the vehicle upon the occurrence of a severe collision can contribute to the tendency of the driver's head to strike the hub or spokes of the steering wheel. Prior art impact energy absorbing members on steering wheels have not been designed for impact by the head of the vehicle operator, which involves a relatively small impact surface area as compared to impact by the upper body of the driver. When a vehicle operator's head impacts upon such prior art safety devices, the safety device may yield too readily causing the occupant's head to strike the internal portions of the steering hub, or the spokes of the steering wheel, resulting in injury.

It is therefore an object of the present invention to provide a new and improved safety device for a vehicle steering wheel.

It is a further object of the present invention to provide such a safety device which prevents injury, even upon impact of a driver's head onto the steering wheel.

SUMMARY OF THE INVENTION

In accordance with the present invention, there is provided a safety device for a vehicle steering wheel having a hub, a rim, and spokes interconnecting the hub with the rim. The device is for protecting a vehicle operator from injury upon impact of the operator's head with the steering wheel. The safety device includes an impact energy dissipating member arranged over the spokes and including a first hollow body and a second hollow body arranged within the first hollow body. The bodies have substantially equal thickness in the direction perpendicular to the plane of said rim and have different widths in at least one other direction in the plane of the rim.

In a preferred embodiment of the invention, the energy dissipating member has a greater horizontal than vertical dimension, measured in the plane of the rim when the steering wheel is in the position for straight vehicle travel. The first hollow body may have a substantially rectangular cross section with rounded corners on the side toward the vehicle occupant. The second hollow body may be tubular, with a rounded or U-shaped cross section. The second hollow body may be filled with a plastic foam. Typically the first and second bodies are both fabricated out of sheet metal and the first body is covered with a foam layer.

For a better understanding of the present invention together with other and further objects thereof, reference is made to the following description taken in conjunction with the accompanying drawings and its scope will be pointed out in the appended claims.

DESCRIPTION OF THE INVENTION

Figure 1:
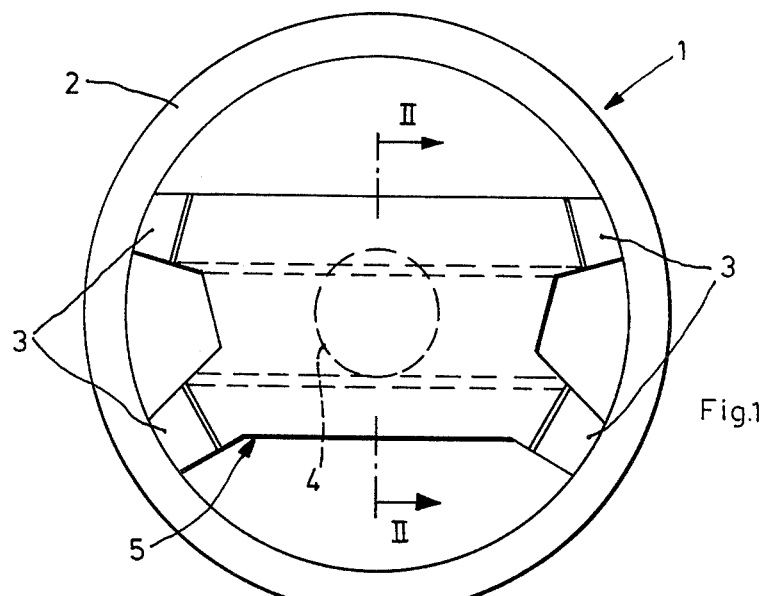
FIG. 1 is a plane view of a steering wheel having a safety device in accordance with the present invention.

FIG. 1 illustrates a plane view of a steering wheel 1 having a safety device 5 in accordance with the present invention. Steering wheel 1 has a rim 2 which is connected to a hub 4 by spokes 3. In the illustration the steering wheel is shown with the orientation which it normally assumes when the vehicle is traveling in a straight line direction. Safety device 5 is arranged across spokes 3 and hub 4 in order to provide protection in the event the vehicle driver impacts on the steering wheel in the event of a collision.

Figure 2:
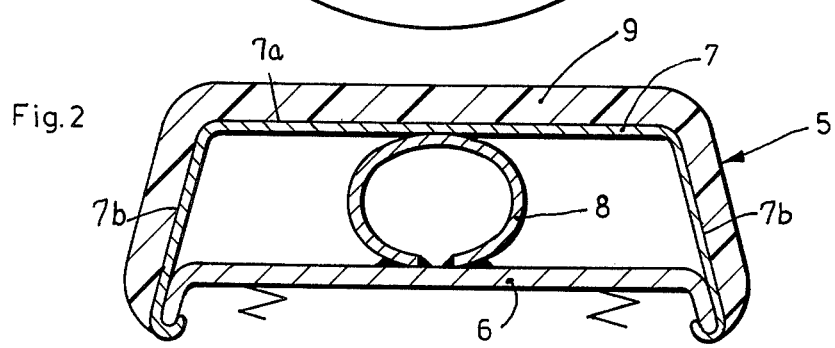
FIG. 2 is a cross section of the safety device illustrated in FIG. 1.

A cross sectional view of the safety device 5 is illustrated in FIG. 2. The safety device is mounted to a supporting structure comprising horn activating plate 6 which is connected to spokes 3 by a spring mounting arrangement. The safety device includes a first hollow body which is a thin wall crushable hollow shell formed from a sheet metal member 7 which has an outer foam covering 9. Member 7 includes an impact surface 7a and sidewalls 7b connected to plate 6. Within hollow member 7 there is a second hollow body 8 which is also a thin wall crushable hollow shell and has a tubular cross sectional shape, which may be either round or oval.

Hollow bodies 7 and 8 are designed to crush upon impact of the vehicle driver with the steering wheel. The crushing of the members 7 and 8 absorbs the impact energy over the crushing distance and therefore provides for deceleration of the vehicle operator with respect to the steering wheel without causing severe injuries. The internal hollow body 8 is arranged to have approximately the same thickness as the body 7 in a direction perpendicular to the spokes 3 of the steering wheel. Because of this thickness, hollow body 8 provides increased support at the center of impact surface 7a hollow body 7 so that upon impact by a relatively small portion of the driver's body, such as his head, there is provided sufficient impact resisting support to effectively decelerate the body portion.

Prior art safety devices of this type have been designed primarily for impact over the entire area of the safety device when the driver's upper body portion is thrown across the steering wheel. In accordance with the present invention the combination of outer hollow body 7 and inner hollow body 8 provides for increased support over the entire area of the safety device and therefore effectively dissipates impact energy when a driver's head is impacted onto the steering wheel. The strength of the sheet metal members 7 and 8 is selected to permit deformation without excessive force on the impacting portion of the driver. The safety device of the present invention therefore provides optimum protection of the vehicle operator from injury in the event of a collision, particularly when used in conjunction with lap and shoulder belts.

Figure 3:
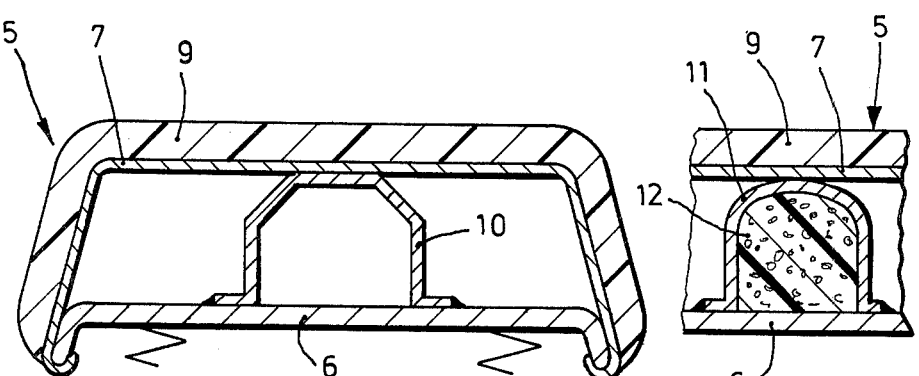
FIG. 3 is a cross sectional view of an alternate configuration usable in the safety device of FIG. 1.
Figure 4:
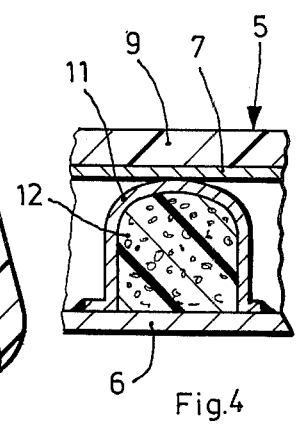
FIG. 4 is a partial cross section of an alternate arrangement for the safety device used in FIG. 1.

Alternate arrangements for the internal hollow body 8 of FIG. 2 are shown in FIGS. 3 and 4. In FIG. 3, internal hollow body 10 is fashioned with a U-shaped cross section having bent arms which are welded to horn activating plate 6. In FIG. 4, a U-shaped hollow body 11 is similarly welded to horn activating plate 6 and has within it a foam support 12 to provide increased energy absorption upon impact of the driver's head.

While there have been described what are believed to be the preferred embodiments of the present invention, those skilled in the art will recognize that other and further modifications may be had thereto without departing from the true spirit of the invention, and it is intended to cover all such embodiments which fall within the true scope of the invention.

We claim:

1. A safety device for a vehicle steering wheel having a hub, a rim, and spokes interconnecting the hub and the rim, for protecting a vehicle operator from injury upon impact of the operator's head with the steering wheel, comprising an impact energy dissipating member arranged over said spokes, said member including a first thin wall crushable hollow shell having an impact surface and side walls mounted to a supporting structure, said first shell being substantially larger in one direction parallel to said impact surface than in the direction perpendicular to said impact surface, and only one second thin wall crushable hollow shell mounted to said supporting structure, said shell being mounted to the central portion of said supporting structure in said parallel direction and in contact with the center of said impact surface within said first shell and spaced from said side walls, said shells having substantially equal thickness in said perpendicular direction and said second shell being substantially smaller than said first shell in said parallel direction and supporting said central portion of said impact surface to render the impact characteristic of said surface substantially uniform over said surface.

2. A safety device as specified in claim 1 wherein said energy dissipating member has a greater horizontal dimension than vertical dimension, measured in the plane of said rim when said steering wheel is in the position for straight vehicle travel.

3. A safety device as specified in claim 1 wherein said first hollow shell has a cross section in a plane perpendicular to the plane of said rim which is substantially rectangular with rounded corners on the side toward a vehicle occupant.

4. A safety device as specified in claim 1 wherein said second hollow shell is tubular and has a rounded cross section.

5. A safety device as specified in claim 1 wherein said second hollow shell has a U-shaped cross section with bent arms.

6. A safety device as specified in claim 1 wherein said second hollow shell is filled with plastic foam.

7. A safety device as specified in claim 1 wherein said first hollow shell comprises sheet metal covered with a foam layer.

8. A safety device as specified in claim 7 wherein said second hollow shell is fabricated from sheet metal.

* * * * *